(12) United States Patent
Rombouts (10) Patent No.: US 7,926,873 B2
(45) Date of Patent: Apr. 19, 2011

(54) VEHICLE SEAT ASSEMBLIES

(75) Inventor: Kenneth Rombouts, Savannah, GA (US)

(73) Assignee: Weber Aircraft LP, Gainesville, TX (US)

( * ) Notice: Subject to any disclaimer, the term of this patent is extended or adjusted under 35 U.S.C. 154(b) by 51 days.

(21) Appl. No.: 12/174,227

(22) Filed: Jul. 16, 2008

(65) Prior Publication Data

US 2009/0058165 A1     Mar. 5, 2009

(51) Int. Cl.
*A47C 31/00* (2006.01)
*A47C 7/62* (2006.01)
*B60N 2/02* (2006.01)

(52) U.S. Cl. .................. 297/217.3; 297/335; 297/188.1

(58) Field of Classification Search .................. 297/331, 297/335, 217.4, 217.3, 332, 334, 336, 188.1, 297/452.18; 244/122 R, 118.6
See application file for complete search history.

(56) References Cited

U.S. PATENT DOCUMENTS

| | | | |
|---|---|---|---|
| 3,468,582 A | | 9/1969 | Judd |
| 3,762,766 A | | 10/1973 | Bareski et al. |
| 5,133,587 A | * | 7/1992 | Hadden, Jr. .................. 297/146 |
| 5,174,526 A | | 12/1992 | Kanigowski |
| 5,409,186 A | * | 4/1995 | Chow ........................ 244/122 R |
| 5,740,989 A | | 4/1998 | Daines |
| 5,829,836 A | * | 11/1998 | Schumacher et al. ........ 297/257 |
| 6,038,426 A | * | 3/2000 | Williams, Jr. .................. 725/77 |
| 6,237,994 B1 | | 5/2001 | Bentley et al. |
| 6,742,840 B2 | | 6/2004 | Bentley |
| 6,761,398 B2 | | 7/2004 | Bentley et al. |
| 6,776,457 B2 | * | 8/2004 | Muin et al. ..................... 297/331 |
| 6,824,213 B2 | * | 11/2004 | Skelly et al. ............... 297/217.3 |
| 6,863,344 B2 | | 3/2005 | Smallhorn |
| 6,899,390 B2 | | 5/2005 | Sanfrod et al. |
| 7,002,265 B2 | | 2/2006 | Potega |
| 7,143,978 B2 | | 12/2006 | Smallhorn |
| 7,520,469 B2 | * | 4/2009 | Baumann .................. 244/122 R |
| 7,520,566 B2 | * | 4/2009 | Braun ........................... 297/335 |
| 2003/0107248 A1 | | 6/2003 | Sanford et al. |
| 2003/0209929 A1 | | 11/2003 | Muin et al. |
| 2004/0212228 A1 | * | 10/2004 | Skelly et al. ............... 297/217.3 |

FOREIGN PATENT DOCUMENTS

| | | |
|---|---|---|
| EP | 1348625 A2 | 10/2003 |
| EP | 1647483 A1 | 4/2006 |
| WO | WO02096700 | 12/2002 |
| WO | WO2009012294 | 1/2009 |

OTHER PUBLICATIONS

International Search Report and Written Opinion dated Jan. 29, 2009 in related International Application Serial No. PCT/US2008/070142.
Selected drawings of portions of Model 5700/5750 seat, Jun. 2005, two pages.
Selected page from Model 5700/5750 Overview, undated, two pages.
Selected pages from Technical Proposal, "Passenger Seating for Asiana B747-400 Aircraft," Mar. 8, 2006, three pages.

* cited by examiner

*Primary Examiner* — Milton Nelson, Jr.
(74) *Attorney, Agent, or Firm* — Dean W. Russell, Esq.

(57) ABSTRACT

The invention provides a design innovation to conventional air passenger seats. The design innovation relates to the positioning of IFE boxes. For a better understanding, the reader may recall the last flight in the airline seat and the way the passenger's leg room was inhibited by a box mounted on the seat leg in front of the passenger. The new design innovation repositions (or "pancakes") the IFE box underneath the seat pan.

5 Claims, 10 Drawing Sheets

VEHICLE SEAT ASSEMBLIES

CROSS-REFERENCE TO RELATED APPLICATION

This application claims the benefit of U.S. Provisional Application No. 60/959,645 filed on Jul. 16, 2007, the contents of which are incorporated herein by reference.

FIELD OF THE INVENTION

This invention relates to adjustable seats and components thereof adapted to perform multiple functions and more particularly (although not exclusively) to aircraft passenger seats designed to enhance packaging of, access to and functionality of in flight entertainment (IFE) equipment.

BACKGROUND OF THE INVENTION

Nowadays aircraft passenger cabinets are constructed or are being retrofit with a wide assortment of personal electronic and entertainment options accessible from the passenger seat. Airline designers keep in mind that they want to encourage passengers to remain seated as much as possible during a flight for safety, crew mobility and to enable the most efficient cabin service. To improve cabin service and make the flight more enjoyable, airlines may provide video and audio entertainment, including television, video games, internet access, and other in-flight entertainment (IFE) components. These amenities are especially offered in first and/or business class cabins and permit passengers to work, communicate, or be entertained during the flight without leaving the comfort of their seat.

Passenger IFE systems such as seat mounted flat screen video monitors, and credit card activated cellular telephones are now most often mounted in the seat backs and arm rests of passenger aircraft. Some airlines also distribute personal DVD/CD players with a choice of movies/music. Passengers may even carry their own laptop computers or DVD/CD players and request power outlets. Within the confines of compact passenger seats fitted with conventional food service trays and arm rests, the available space is often inadequate. It has been considered necessary to fit all IFE equipment within the passenger seat itself. Thus, for IFE equipment such as a seat mounted display, the electrical wiring, components, processor unit, etc. is stored within an IFE box. The IFE box is typically mounted on the side of the seat frame leg structure, thus inhibiting leg room, storage space under the passenger seat, and exposing the IFE components to debris and liquids.

Current seat design, specifically the seat pan, prohibits or limits airline technicians' access to the IFE boxes when service is required and the technicians are forced to crawl on the floor of the aircraft (or possibly even remove one or more seats) in order to properly access and service the IFE boxes. This inconvenience greatly increases repair time and reduces accuracy, and often times requires a repair to be performed on an particular IFE box multiple times until the issue is properly resolved.

Additionally, regarding the seat design, a conventional hydrolock which operates on a bell crank is often positioned either on the side of the passenger seat frame or in the center of the seat frame below the seat pan. If mounted on the side the hydrolock may be exposed to debris and liquids, which exposure could shorten its service life. More importantly, the conventional placement of hydrolocks on the seat frame may prohibit (or at least limit) access to the IFE box, by not allowing a technician to access the IFE box from a vertical (upright standing above) position versus crawling underneath the passenger seat.

SUMMARY OF THE INVENTION

The invention provides a design innovation to conventional air passenger seats. The design innovation relates to the positioning of IFE boxes. For a better understanding, the reader may recall the last flight in the airline seat and the way the passenger's leg room was inhibited by a box mounted on the seat leg in front of the passenger. The new design innovation repositions (or "pancakes") the IFE box underneath the seat pan.

The invention also provides a design innovation relating to the functionality of the seat pan. The new design innovation creates a seat pan pivotable relative to the seat frame. Thus a service technician can lift up the pivotable seat pan and access the IFE box from above the seat and no longer has to crawl on the floor to access the IFE box. The pivotable seat pan gives the service technician more efficient and accurate access to the IFE box to enable a more timely and successful repair.

The invention also provides a design innovation relating to the positioning of the hydrolocks. The new design innovation repositions and adheres the hydrolock to the center of the seat pan. The adherence of the hydrolock to the pivotable seat pan, causes the hydrolock to move with the pivotable seat pan as the seat pan is rotated up, thereby providing an unobstructed access to the pancaked IFE box. The new hydrolock design innovation additionally shields the hydrolock from debris and liquids, and improves service life of the hydrolock and moving components by more evenly loading the back—seatpan system.

It is an object of the present invention to reposition the IFE boxes in order to create more leg room and storage space under the passenger seats, and minimize exposure to debris and liquids.

It is another object of the present invention to provide an alternate and improved means for service technicians to access the IFE boxes.

It is a further object of the present invention to provide an alternate and improved hydrolock mounting design to facilitate service technicians access to the IFE boxes.

Other features, advantages, and objects of the present invention will be apparent to those skilled in the art with reference to the remaining text and drawings of this application.

DETAILED DESCRIPTION

Figure 1:
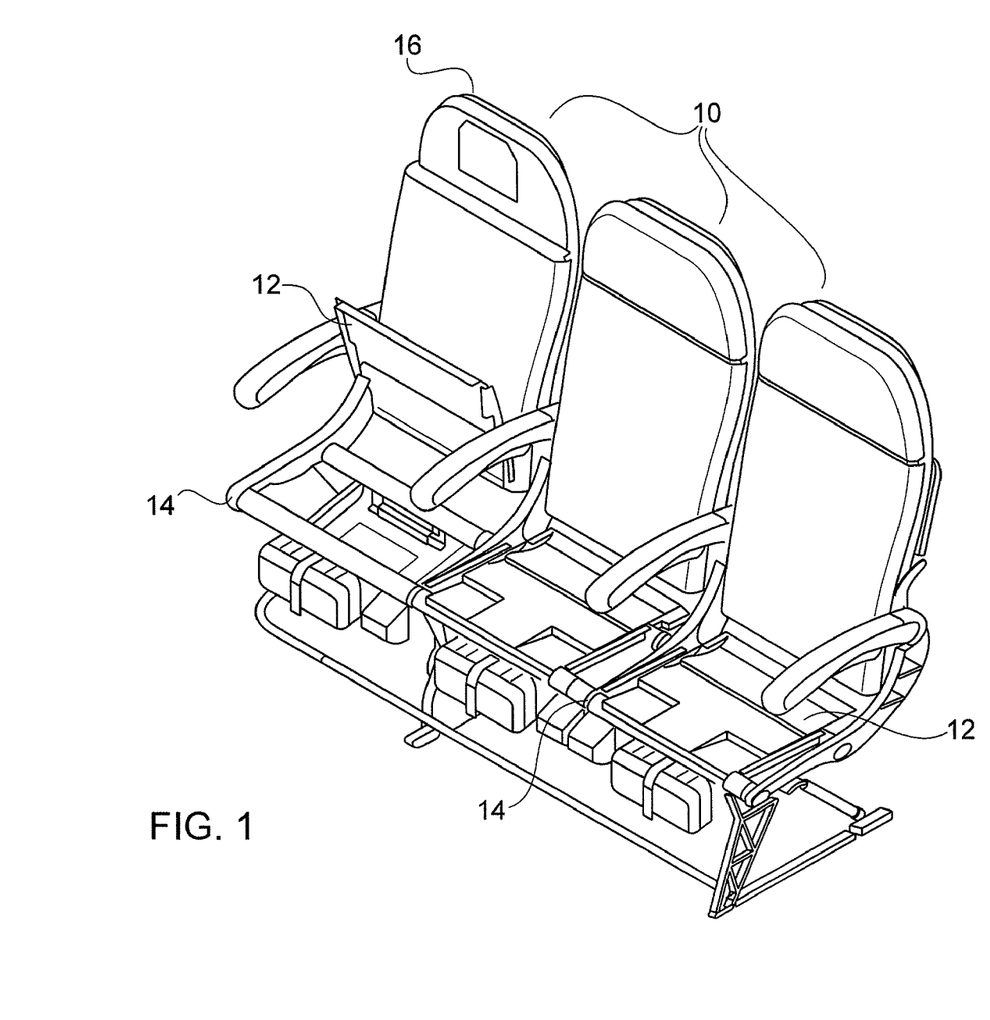
FIG. 1 illustrates a row of exemplary seats of the present invention.

FIG. 1 illustrates a row of exemplary seats 10. Each seat 10 may include a seat pan 12, a seat frame 14, and an in-flight entertainment (IFE) display 16 (in back of seat). As illustrated in FIG. 1 the seat pan 12 is pivotable in an upward direction relative to the seat frame 14. The installation of the pancaked IFE box 18 in FIG. 2, attached to the seat frame 14 provides the passenger more leg room and baggage space underneath the seat, as illustrated in FIG. 1. Also as illustrated in FIG. 1 the design of the pancaked IFE box 18 attached to the seat frame 14 below the seat pan 12 shields the pancaked IFE box 18 from debris and liquids when the seat pan 12 is in a down or shut position.

Figure 2:
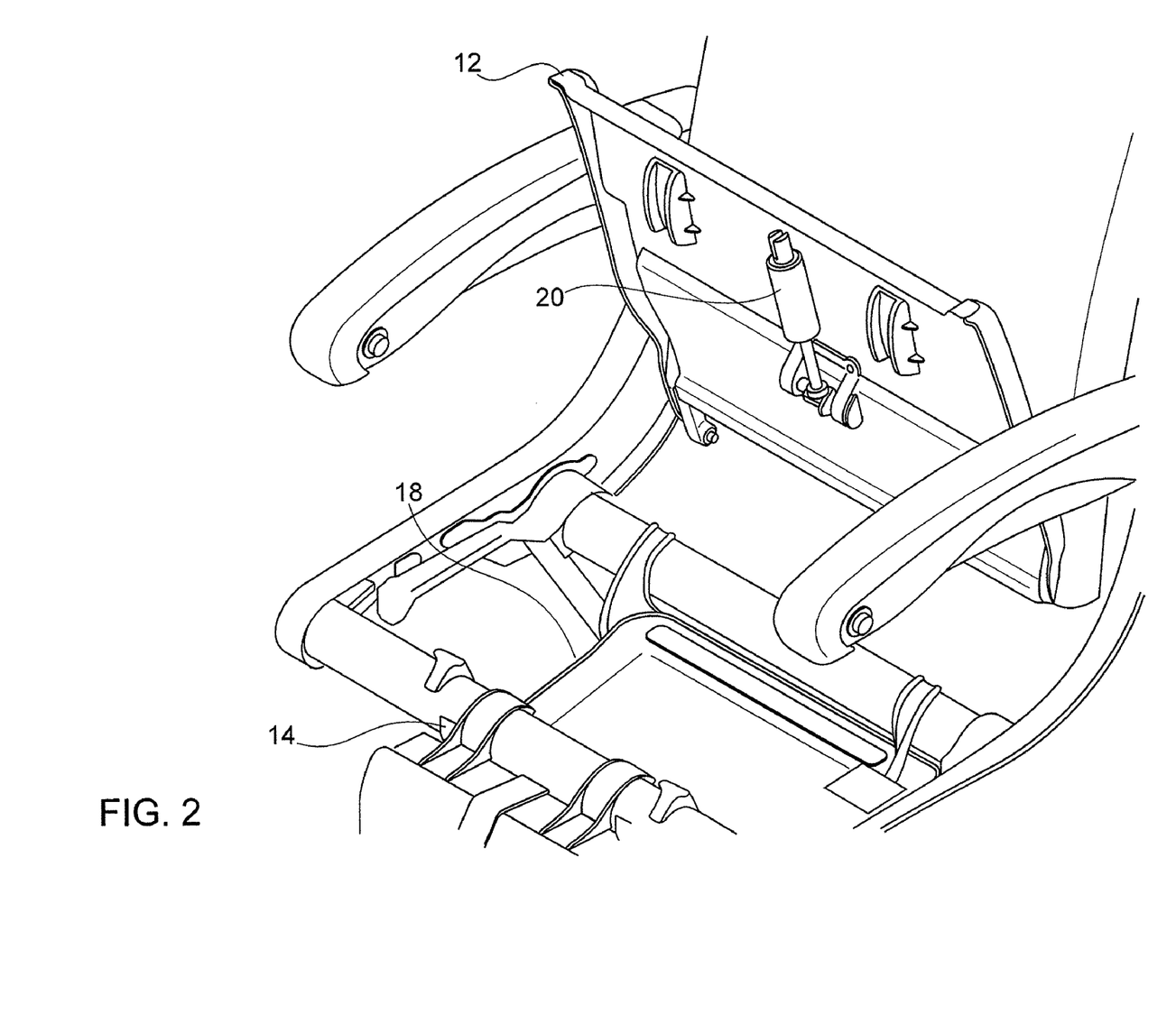
FIG. 2 is a magnified view of a seat of FIG. 1.
Figure 3:
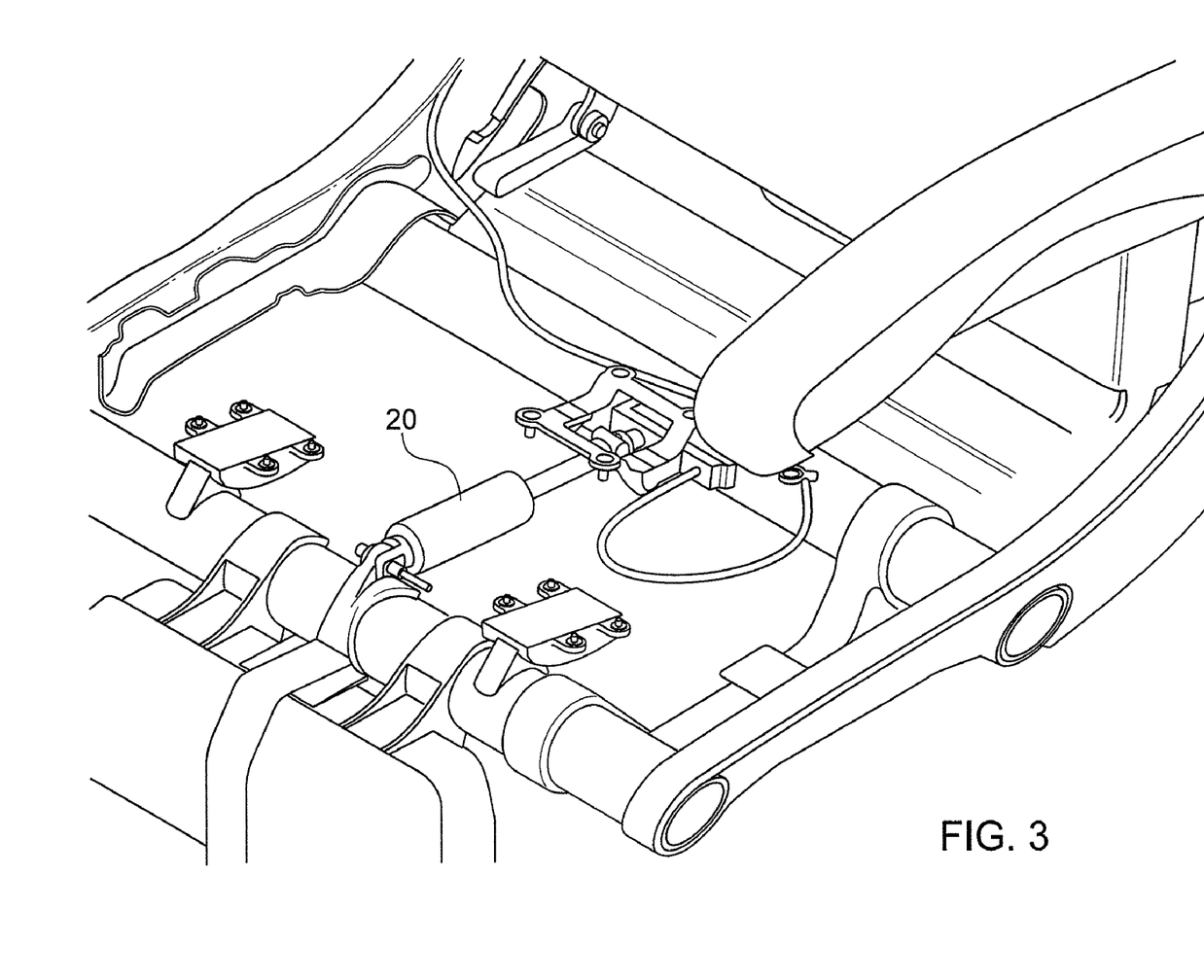
FIG. 3 is a transparent magnified view of an exemplary hydrolock positioning of the present invention.
Figure 8A:
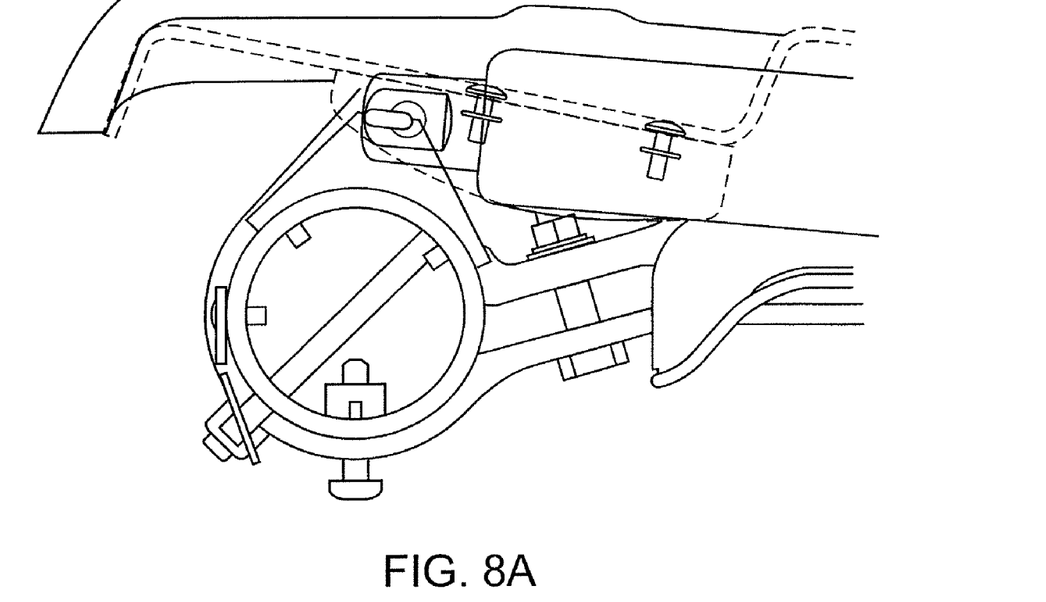
FIGS. 8A-B illustrate a cross-sectional view of an exemplary hydrolock positioning of the present invention.
Figure 8B:
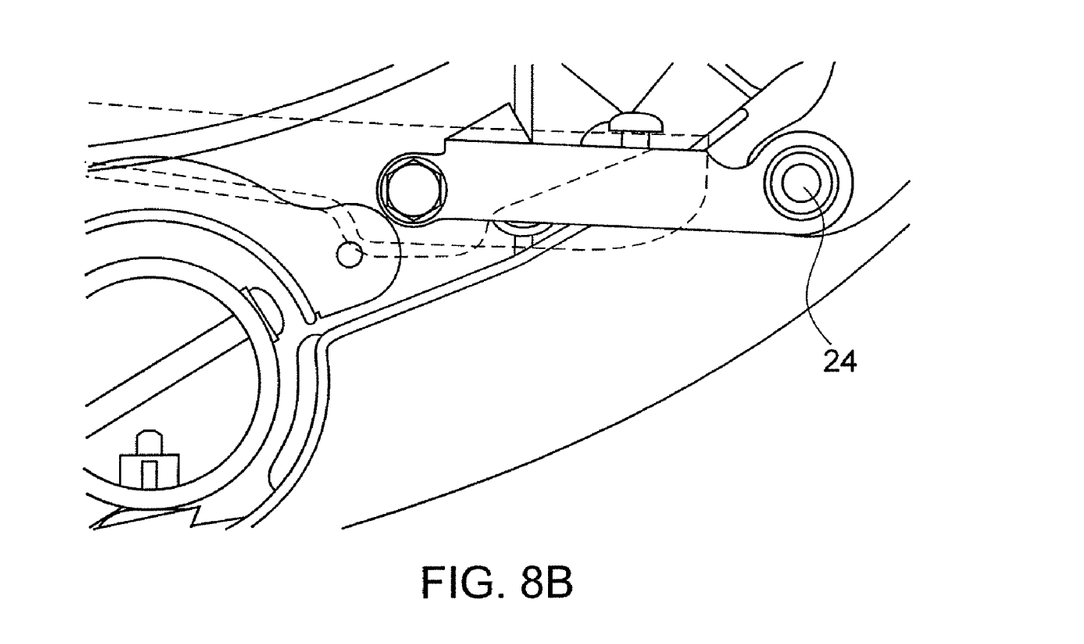

As shown in FIG. 2, the pivotable seat pan 12 when pivoted upward permits access to the pancaked IFE box 18 attached to the seat frame 14. FIG. 2 also illustrates the center positioning and attachment of the hydrolock 20 to the seat pan 12, such that when the seat pan 12 is rotated up the hydrolock 20 also rotates up creating a clear access pathway to the pancaked IFE box 18 attached to the seat frame 14. As shown in FIG. 8B the seat pan 12 contains hinges 24, which permit the seat pan 12 to be pivotable in relation to the seat frame 14. As shown in FIG. 3 via a transparent view, the hydrolock 20 is centered on and attached to the seat pan 12.

Figure 4:
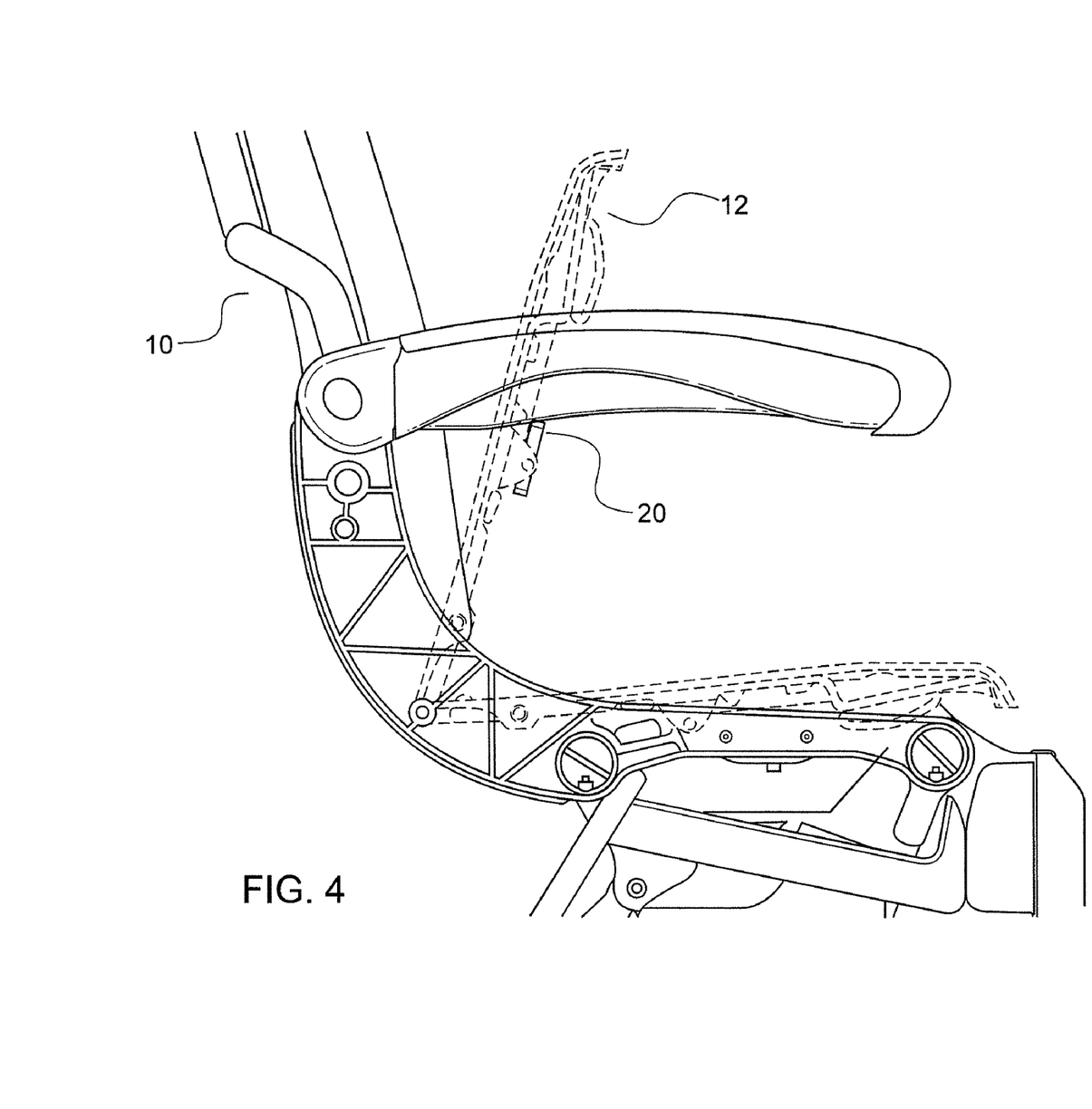
FIG. 4 is a transparent cross-sectional view of a seat of FIG. 1.
Figure 5:
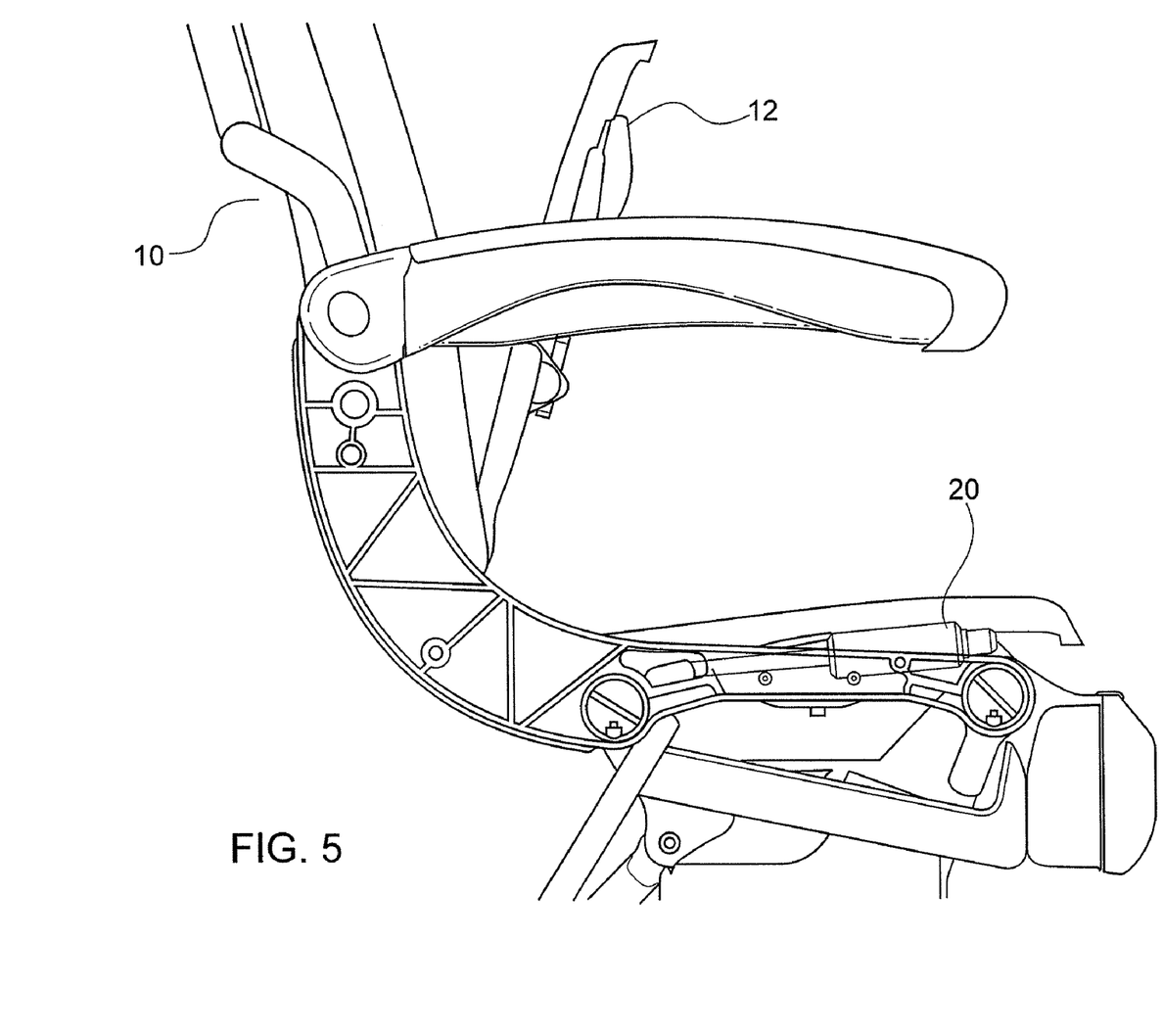
FIG. 5 is a cross-sectional view of a seat of FIG. 1.

FIG. 4 illustrates a cross-sectional view of the seat 10 where the seat pan 12 and the attached hydrolock 20 are in an upward position. FIG. 5 provides an alternate view of the hydrolock 20 when the seat pan 12 is in a down position thus the hydrolock is shielded from debris and liquids.

Figure 6:
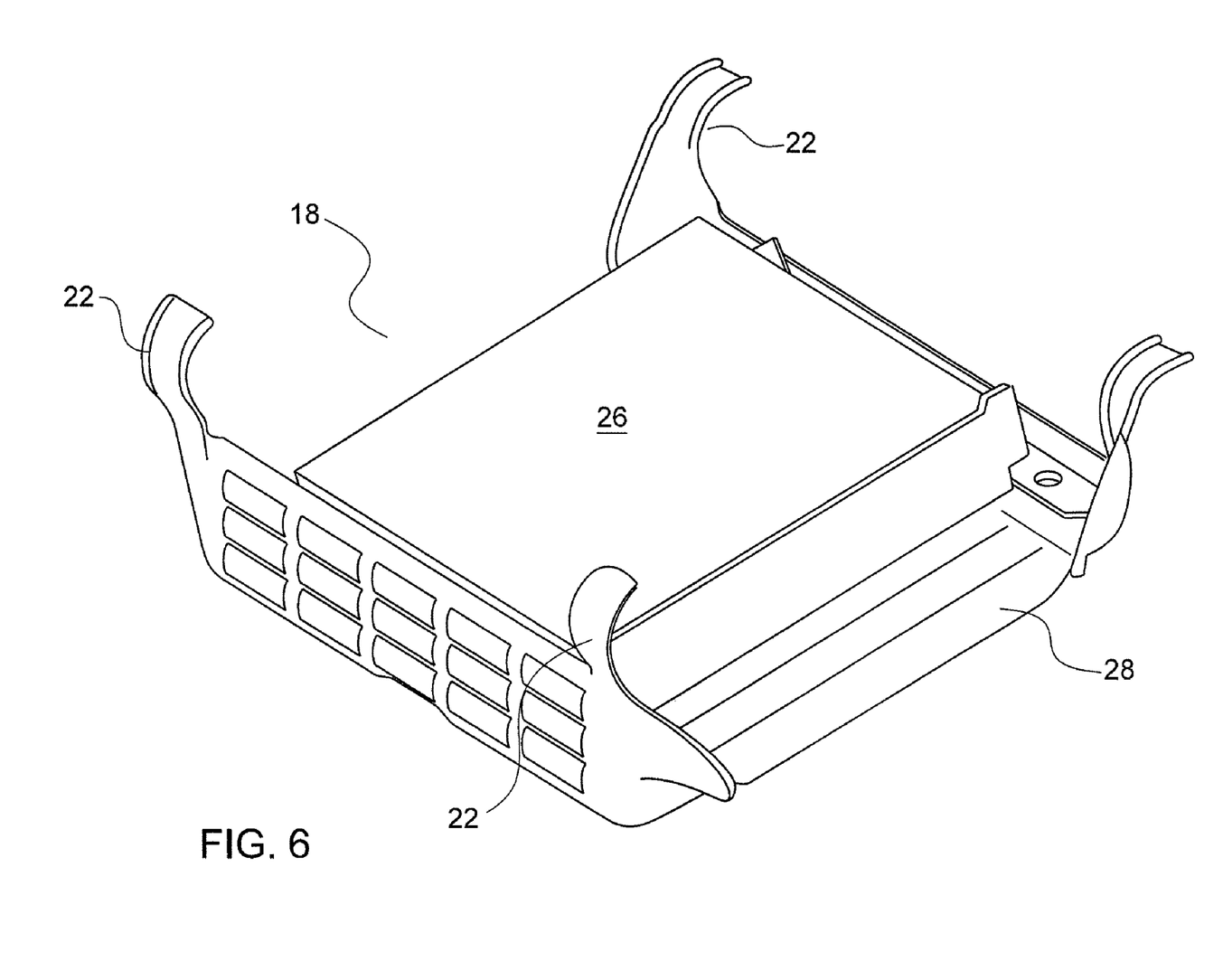
FIG. 6 is an exemplary IFE mounting box of the present invention.

As shown in FIG. 6 the pancaked IFE box 18 comprises a cradle 28 in which the IFE electrical components 26 are placed and then the pancaked IFE box 18 is attached to the seat frame 14 via the four attachment arms 22 located at each corner of the pancaked IFE box 18. The attachment arms 22 permit the pancaked IFE box 18 to be securely positioned on the seat from 14 below the seat pan 12. The cradle 28 permits the IFE electrical components 26 to be secured within the pancaked IFE box 18. The close proximity of the pancaked IFE box 18 in relation to the seat pan 12, shields the IFE electrical components 26 from debris and liquids.

Figure 7:
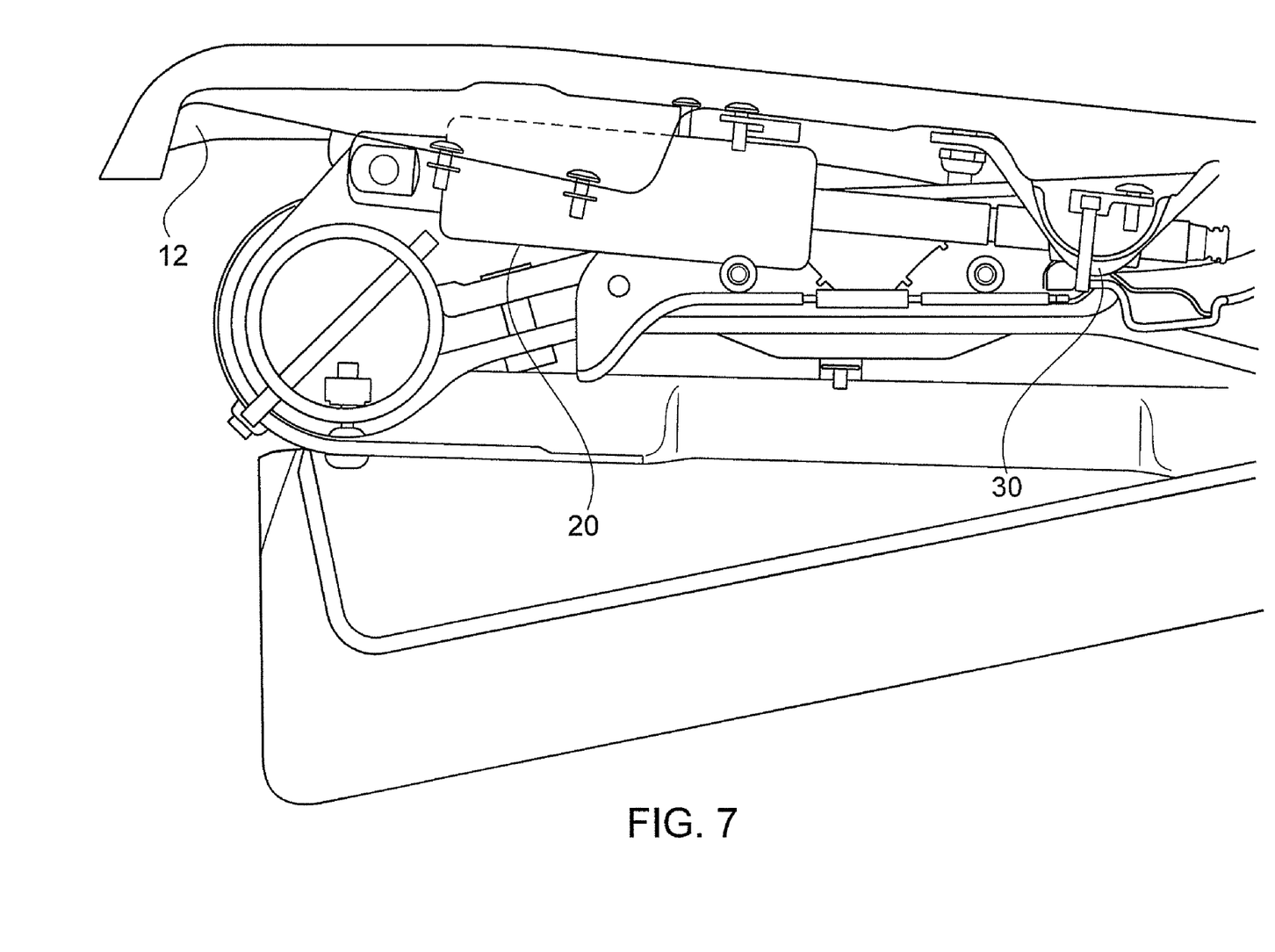
FIG. 7 is a magnified cross-sectional view of a seat of FIG. 1.
Figure 9A:
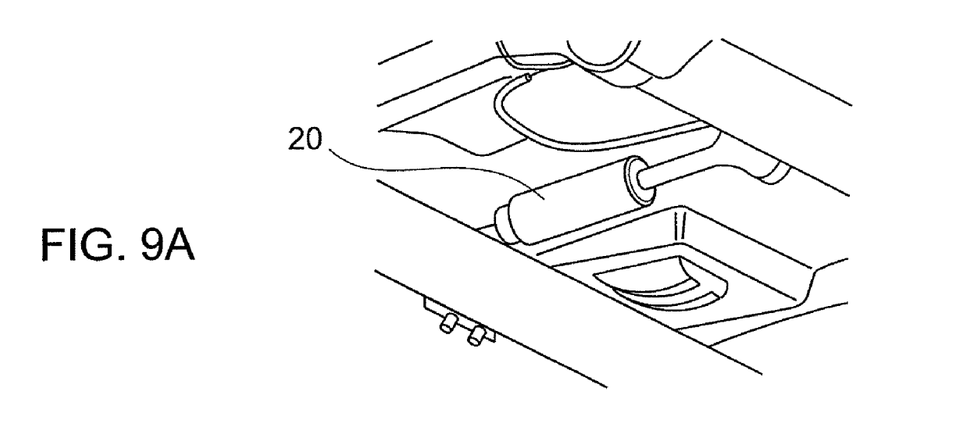
FIGS. 9A-E illustrate a magnified view of an exemplary hydrolock positioning of the present invention.
Figure 9B:
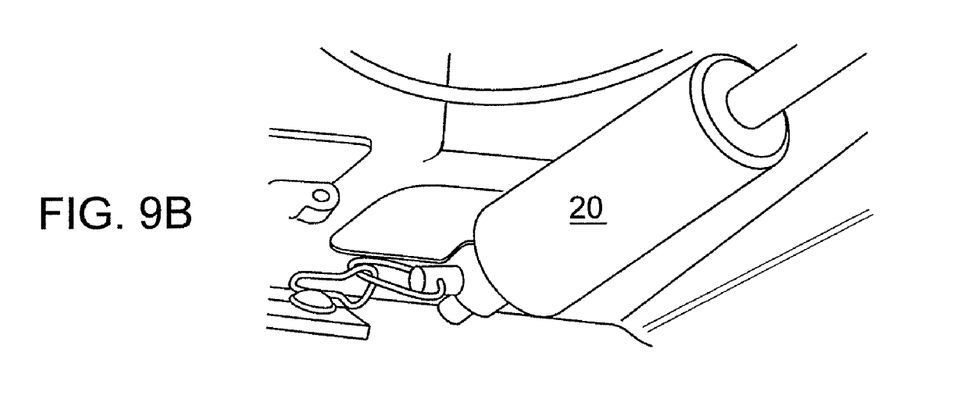
Figure 9C:
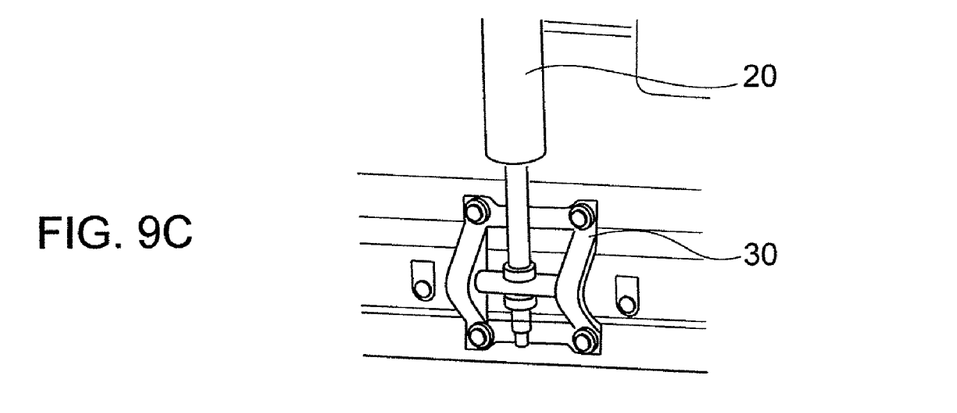
Figure 9D:
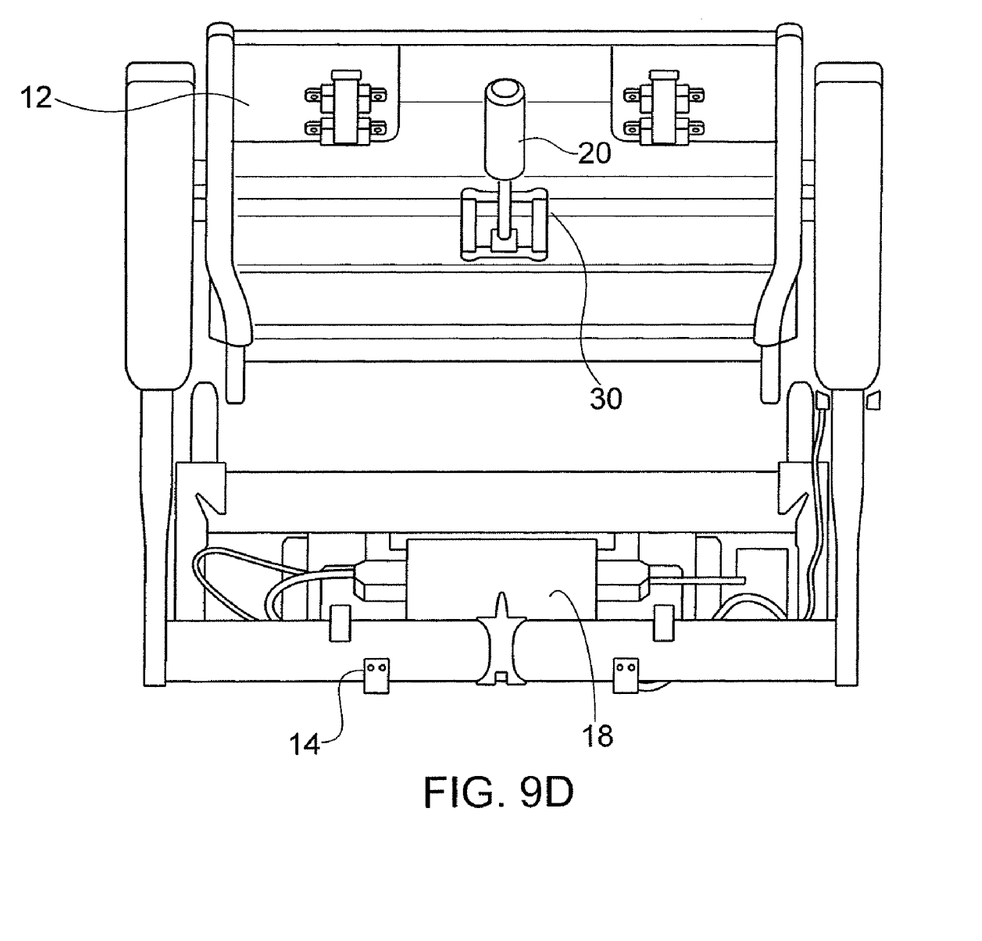
Figure 9E:
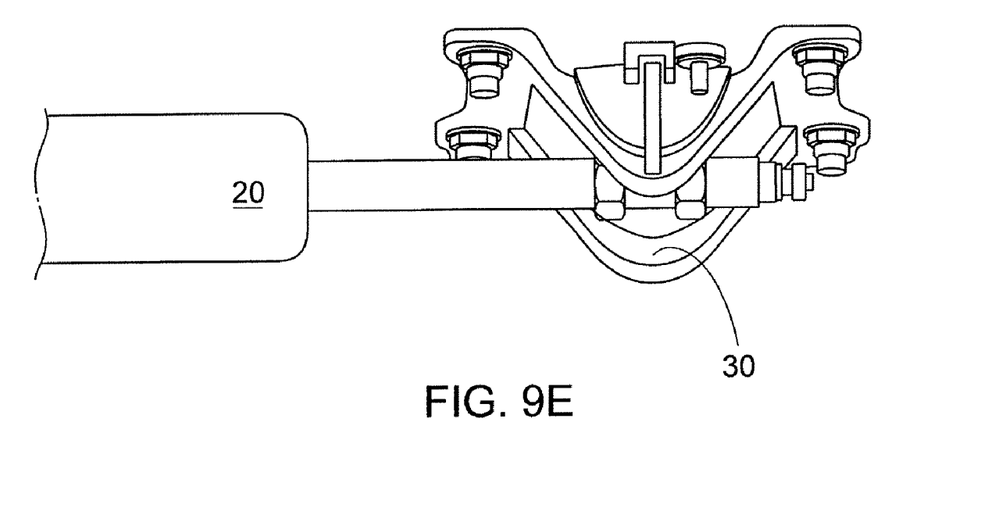

As shown in FIG. 7 the hydrolock 20 is integrally attached to the seat pan 12, via a mounting assembly (or apparatus) 30, such that the seat pan 12 and hydrolock 20 operate as one-piece when the seat pan 12 is rotated up. FIGS. 9A-B illustrate alternate views of the hydrolock 20 as it is centered on and attached to the seat pan 12. As shown in FIGS. 9C and 9E the hydrolock 20 is secured to the seat pan 12 via the mounting apparatus 30, wherein the mounting apparatus 30 is fastened to the seat pan 12 and holds the hydrolock 20 in position on the seat pan 12. FIG. 9D illustrates the pivotable seat pan 12 in an upright position, the hydrolock 20 centered on the seat pan 12 and attached to the seat pan 12, such that when the seat pan 12 rotates up, the hydrolock 20 also rotates up. FIG. 9D also illustrates the pancaked IFE box 18 secured to the seat frame 14, such that when the seat pan 12 and the attached hydrolock 20 are rotated up there is a clear access pathway to the pancaked IFE box 18 as secured to the seat frame 14.

The foregoing is provided for purposes of illustrating, describing, and explaining embodiments of the present invention. Further modifications and adaptations to these embodiments will be apparent to those skilled in the art and may be made without departing from the scope or spirit of the invention.

The invention claimed is:

1. A passenger seat for a vehicle having a floor, the passenger seat comprising:
   a. a seat frame comprising a generally horizontal portion configured to be positioned above the floor in use;
   b. a seat pan connected to the seat frame;
   c. a hydrolock attached to the seat pan; and
   d. a box (i) connected to the seat frame underneath the seat pan and (ii) containing in-flight entertainment equipment; and
   in which the seat pan is configured to pivot relative to the seat frame from (i) a first position in which the seat pan is (A) available to support a seated passenger and (B) adjacent the generally horizontal portion of the seat frame to (ii) a second position in which (A) the box is accessible via the space formerly occupied by the seat pan when in the first position and (B) the seat pan is not adjacent the generally horizontal portion of the seat frame.

2. A passenger seat according to claim 1 in which the seat pan has an underside and the hydrolock is attached to the underside.

3. A passenger seat according to claim 1 in which the box comprises (a) a cradle containing the in-flight entertainment equipment and (b) means, comprising a plurality of arms, for connecting the cradle to the seat frame.

4. A passenger seat according to claim 3 in which the seat pan and the box at least partially shield the in-flight entertainment equipment from contact with debris and liquids.

5. A passenger seat for an aircraft having a floor, the passenger seat comprising:
   a. a seat frame comprising a generally horizontal portion configured to be positioned above the floor in use;
   b. a seat pan (i) connected to and configured to pivot relative to the seat frame, (ii) defining lateral edges and a forward edge, and (iii) having an underside;
   c. a box (i) connected to the seat frame underneath the seat pan and (ii) comprising (A) a cradle configured to contain in-flight entertainment equipment and (B) means for connecting the cradle to the seat frame; and
   d. a hydrolock attached to the underside of the seat pan between the lateral edges of the seat pan; and
   in which (i) the seat pan is configured to pivot relative to the seat frame from (A) a first position in which the seat pan is available to support a seated passenger and the forward edge of the seat pan is adjacent the generally horizontal portion of the seat frame to (B) a second position in which the box is accessible via the space formerly occupied by the seat pan when in the first position and the forward edge of the seat pan is not adjacent the generally horizontal portion of the seat frame and (ii) the hydrolock pivots relative to the seat frame as the seat pan pivots relative to the seat frame.

* * * * *